United States Patent
Gray et al.

(10) Patent No.: US 9,893,764 B2
(45) Date of Patent: *Feb. 13, 2018

(54) CABLE NETWORK SPECTRAL MEASUREMENT DURING UPSTREAM PACKET TRANSMISSION

(71) Applicant: VIAVI SOLUTIONS INC., Milpitas, CA (US)

(72) Inventors: Adam D. Gray, Avon, IN (US); Daniel K. Chappell, Greenwood, IN (US); Ching-Chang Liao, Fishers, IN (US)

(73) Assignee: VIAVI SOLUTIONS INC., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/497,874

(22) Filed: Apr. 26, 2017

(65) Prior Publication Data

US 2017/0230079 A1 Aug. 10, 2017

Related U.S. Application Data

(63) Continuation of application No. 14/323,071, filed on Jul. 3, 2014, now Pat. No. 9,634,722.

(60) Provisional application No. 61/842,555, filed on Jul. 3, 2013.

(51) Int. Cl.
*H04B 3/46* (2015.01)
*H04L 12/26* (2006.01)
*H04L 29/06* (2006.01)

(52) U.S. Cl.
CPC ........... *H04B 3/46* (2013.01); *H04L 43/0847* (2013.01); *H04L 43/106* (2013.01); *H04L 43/50* (2013.01); *H04L 69/22* (2013.01)

(58) Field of Classification Search
CPC .... H04W 24/08; H04L 43/50; H04L 43/0847; H04L 1/20; H04L 43/0858; H04B 3/46
See application file for complete search history.

(56) References Cited

U.S. PATENT DOCUMENTS

| | | |
|---|---|---|
| 6,711,134 B1 | 3/2004 | Wichelman et al. |
| 6,880,170 B1 | 4/2005 | Kauffman et al. |
| 6,895,043 B1 | 5/2005 | Naegeli et al. |
| 6,961,314 B1 * | 11/2005 | Quigley ............... H04J 3/0682 370/252 |
| 7,254,827 B1 | 8/2007 | Terreault |
| 7,420,986 B1 | 9/2008 | Howard et al. |
| 2003/0165205 A1 * | 9/2003 | Chu .................... H04B 1/1027 375/346 |
| 2004/0037217 A1 | 2/2004 | Danzig |
| 2004/0203392 A1 | 10/2004 | Hsu et al. |
| 2006/0141971 A1 | 6/2006 | Howard |

(Continued)

*Primary Examiner* — Jae Y Lee
(74) *Attorney, Agent, or Firm* — Mannava & Kang, P.C.

(57) ABSTRACT

Apparatus and method are provided for obtaining an upstream signal spectrum as it was during a time of transmission of a received upstream data packet. The apparatus includes an analog-to-digital converter (ADC), a packet detector coupled to ADC, and a spectrum calculation unit coupled to the ADC and the packet detector. In operation, the spectrum calculation unit computes a spectrum of the digitized upstream signal as it was between the start and end times of the first packet. As a result, the obtained spectrum is representative of a condition of the transmission path during transmission of the upstream data packet.

20 Claims, 5 Drawing Sheets

(56) References Cited

U.S. PATENT DOCUMENTS

| | | |
|---|---|---|
| 2012/0069916 A1 | 3/2012 | Berscheid |
| 2012/0213259 A1 | 8/2012 | Renken et al. |
| 2014/0269867 A1* | 9/2014 | Meller .................... H04B 3/46 |
| | | 375/224 |

* cited by examiner

CABLE NETWORK SPECTRAL MEASUREMENT DURING UPSTREAM PACKET TRANSMISSION

CROSS-REFERENCE TO RELATED APPLICATIONS

The present application is a Continuation of commonly assigned U.S. patent application Ser. No. 14/323,071, filed Jul. 3, 2014, which claims priority to U.S. provisional patent application Ser. No. 61/842,555 filed Jul. 3, 2013, which are hereby incorporated by reference in their entireties.

TECHNICAL FIELD

The present invention relates to cable network testing, and in particular to spectral measurements in a cable network.

BACKGROUND

A cable network delivers services such as digital television, Internet, and Voice-over-IP (VoIP) phone connection. The services are delivered over a tree-like network of a broadband coaxial cable termed a "cable plant". Digital television signals are broadcast from a headend connected to the trunk of the cable plant, and delivered to subscribers' homes connected to the branches of the cable plant. In going from the headend to the subscribers, the signals are split many times, and are attenuated in the process. A strong downstream broadcast signal is required to ensure a strong enough signal level at the subscribers' premises.

Internet and VoIP services use signals directed from the subscribers' premises back to the headend, or "upstream" relative to the broadcast signal. The tree-like structure of the cable plant ensures that the upstream signals are brought together into the common trunk connected to the headend. Time-division multiple access (TDMA) is used for each upstream frequency channel to ensure that the upstream signals at a same channel frequency do not interfere with each other as they are combined.

Unfortunately, not only the upstream signals, but also noise can propagate in the upstream direction. The noise originates at customers' premises due to improper cable grounding or shielding, non-professional equipment installation, loose connectors, unshielded indoor equipment such as electrical motors, TV sets, and the like. Old or improperly configured cable modems can also contribute to upstream noise, by emitting at frequencies outside of assigned channel frequency, e.g. harmonics of a main emission frequency band can be generated due to nonlinearities of the modem's output amplifier, oxidized cable connectors and splitters, etc. This ingress noise is particularly problematic in the upstream direction, because as it propagates from many end locations towards the common trunk of the cable plant, it tends to accumulate and grow in magnitude, compromising or even completely disabling digital communications, at least for some subscribers.

A further problem for the upstream direction is that the upstream signals occupy a lower frequency band, typically from 5 MHz to 45 MHz, as compared to the downstream signals spanning typically from 50 MHz to 1 GHz. Thus, the upstream signals are closer in frequency to ingress noise, which tends to be a low-frequency noise. One typical source of upstream noise is so called "common path distortion" or CPD, which appears at beat frequencies of a powerful downstream signal, which are generated on nonlinear elements such as oxidized connectors. The signal at beat frequencies propagates in the upstream direction, contributing to the ingress noise. Other types of ingress noise include interference from power lines, electrical motors, radar equipment, etc. Different types of ingress noise have different spectral characteristics.

An insight into possible sources of ingress noise can be gleaned by measuring spectral behavior of the upstream signal. Once a type of ingress noise is identified, a technician may be dispatched to locate and eliminate the source of the ingress noise. The technician usually travels along the cable plant, making ingress noise measurements on each leg of a bridge amplifier, and proceeding to a next location corresponding to the "noisiest" leg of the amplifier.

Because the ingress noise troubleshooting can take many hours of technician's work, which sometimes extends for days, various methods have been suggested to alleviate the noise problem for as many customers as possible, at least for the time while the source of the ingress noise is located and dealt with. By way of example, Hsu et al. in US Patent Application Publication 2004/0203392 and Howard in US Patent Application Publication 2006/0141971 disclose a method for maintaining an upstream communication in presence of CPD ingress noise. The method includes detecting the CPD ingress noise and constraining upstream transmission parameters to exclude the CPD frequencies. The CPD ingress noise is detected in Hsu and Howard systems by performing a fast Fourier transform (FFT) of the upstream signal and looking for CPD spectral patterns. Detrimentally, the constrained upstream transmission parameters may reduce the available upstream transmission bandwidth, so that a subsequent identification and elimination of the CPD sources is still required. The previously measured CPD spectra are of a limited value for this purpose, because the noise spectra are time-varying, and varying from location to location of a cable plant; this spatial and temporal ingress noise variability represents a serious challenge for cable network service providers. Furthermore, CPD has become more difficult to tell apart from other types of ingress noise, because the downstream channels moved from analog to digital encoding, and as a result no longer have a constant frequency.

Naegeli et al. in U.S. Pat. No. 6,895,043 disclose a method and an apparatus for measuring "quality" of upstream signals. A cable network headend assigns a normal time slot to a cable modem being tested. An FFT engine obtains an upstream signal spectrum during this time slot. A dummy time slot, not assigned to any cable modem, is created, and the FFT engine obtains an upstream signal spectrum during the dummy time slot as well. The two spectra are then compared to each other. Through this comparison, undesirable noise spurs, caused by the cable modem being tested, can be detected. For example, out-of-band frequency harmonics of an aged output amplifier and/or connectors of the cable modem can be detected.

Detrimentally, in the method of Naegeli, one can only get an update during the ranging time slot. If there is only a ranging time slot once per second, then the update will be once per second, and a chance of catching noise will be small. Another drawback results from having to request a dummy time slot as a reference. The cable modem termination system (CMTS) is often configured to keep statistics related to modem quality. A dummy slot may be shown as a lost transmission in these statistics. As a result, the node being tested may be inadvertently flagged by the CMTS as a "poor" node. Furthermore, a modem is needed to be able to request a packet. This increases the electrical power requirement for a field instrument, degrading battery life and usage time.

It is noted that the prior-art methods of upstream signal spectral measurements share a common drawback of not being tied to a particular upstream transmission packet emitted by a modem under test. The ingress noise is not constant in time, often being sporadic and/or pulsed in nature. Accordingly, the measured upstream spectra may not be representative of problems with an upstream data transmission by a particular cable modem.

SUMMARY

It is a goal of the invention to overcome at least some of the above mentioned problems and deficiencies of the prior art.

The present invention provides an apparatus for testing a transmission path of an upstream signal in a cable network, the upstream signal comprising a plurality of frequency channels, the apparatus comprising:

an analog-to-digital converter (ADC) configured to digitize the upstream signal into a digitized upstream signal;

a packet detector, communicatively coupled to the ADC, configured to determine start and end times of a first packet received by the apparatus in a first channel of the plurality of frequency channels of the digitized upstream signal; and a spectrum calculation unit, communicatively coupled to the ADC and the packet detector, configured to compute a spectrum of a portion of the digitized upstream signal, the portion extending between the start and end times of the first packet determined by the packet detector, whereby the computed spectrum is representative of a condition of the transmission path during transmission of the first packet.

The apparatus can include a digital downconverter (DDC) coupled to the ADC, for selecting the first channel, the digital downconverter optionally including the packet detector, which may be configured to determine the start and end times by detecting a radio frequency (RF) power level in the first channel crossing a pre-defined threshold. A demodulator and decoder may be coupled to the DDC. In one embodiment, the demodulator/decoder determines the start and end times by receiving and analyzing a preamble of the packet. When a demodulation or decoding error of a received packet is detected, a corresponding spectrum of the upstream signal, as it has been during the transmission of the erroneous packet, may be selected for displaying and/or subsequent processing, to facilitate determining causes of the error.

In accordance with another aspect of the invention, there is further provided a method for testing a transmission path of an upstream signal in a cable network, the upstream signal comprising a plurality of frequency channels, the method comprising:

(a) using an analog-to-digital converter (ADC) to digitize the upstream signal to obtain a digitized upstream signal;

(b) using a packet detector to determine start and end times of a first received packet of a first channel of the plurality of frequency channels of the digitized upstream signal; and (c) using a spectrum calculation unit to compute a spectrum of a portion of the digitized upstream signal, the portion extending between the start and end times of the first packet determined by the packet detector, whereby the computed spectrum is representative of a condition of the transmission path during transmission of the first packet.

An alarm may be automatically raised when a power level at a pre-defined frequency of the spectrum obtained in step (c) exceeds a threshold. Step (b) may include down-converting the digitized upstream signal to select the first channel, wherein the start and end times are determined by detecting an RF power level in the first channel crossing a pre-defined threshold. Step (c) may include performing a plurality of FFT cycles, each FFT computing an intermediate FFT spectrum of only a sub-portion of the digitized upstream signal portion between the start and end times of the first packet. As a result, each intermediate FFT spectrum is representative of a condition of the transmission path during transmission of the corresponding sub-portion of the digitized upstream signal portion. These intermediate FFT spectra may be accumulated or averaged for subsequent displaying and/or processing.

BRIEF DESCRIPTION OF THE DRAWINGS

Exemplary embodiments will now be described in conjunction with the drawings, in which.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art.

Figure 1:
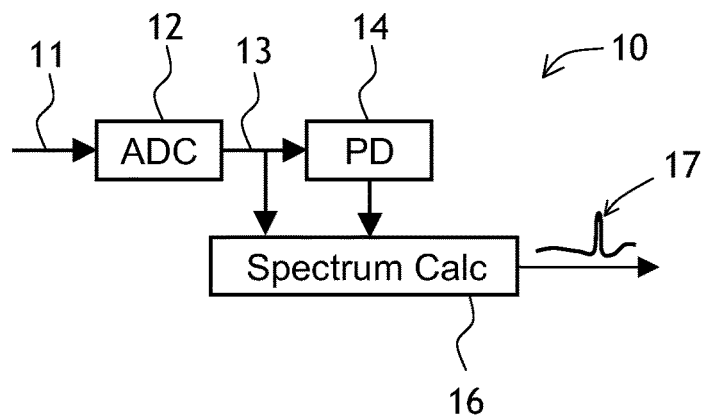
FIG. 1 illustrates a schematic block diagram of an apparatus of the invention for testing a transmission path of an upstream signal.

FIG. 1 shows an apparatus 10 for testing a transmission path of an upstream signal 11 in a cable network, not shown. The upstream signal 11 may include a plurality of upstream frequency channels. TDMA may be employed in each upstream channel to make sure that data packets from individual cable modems, not shown, do not collide with each other.

The apparatus 10 may include an analog-to-digital converter (ADC) 12 for digitizing the upstream signal 11 to obtain a digitized upstream signal 13. A packet detector 14 may be communicatively coupled to the ADC 12 for determining start and end times of a first data packet received by the apparatus 10 in a first channel of the plurality of frequency channels of the digitized upstream signal 13. A spectrum calculation unit 16, which may be an FFT unit, may be communicatively coupled to the ADC 12 and the packet detector 14 for computing a spectrum 17 of a portion of the digitized upstream signal 13, the portion extending between the start and end times of the first packet determined by the packet detector 14. In other words, only the portion of the digitized upstream signal 13, which extends, or spans in time domain, between the start and end times of the first packet, may be used to compute the spectrum 17. As a result, the obtained spectrum 17 may be representative of a condition of the transmission path during transmission of the first packet. Herein, the terms "first", "second", and the like in reference to a packet, a frequency channel, etc., is not meant to denote the order in a succession of packets or channels; instead, it is used merely for convenience, as an identifier of a packet or channel.

Even though the spectrum 17 of the digitized upstream signal is obtained from the portion of the digitized upstream signal 13 spanning between the start and end times of the first packet, it may be understood that there is no requirement to perform an actual calculation of the spectrum 17 during the time interval between the start and end times. The calculation may be performed at a later time, by processing a buffered digitized upstream signal between the start and end times of the first packet.

Figure 2:
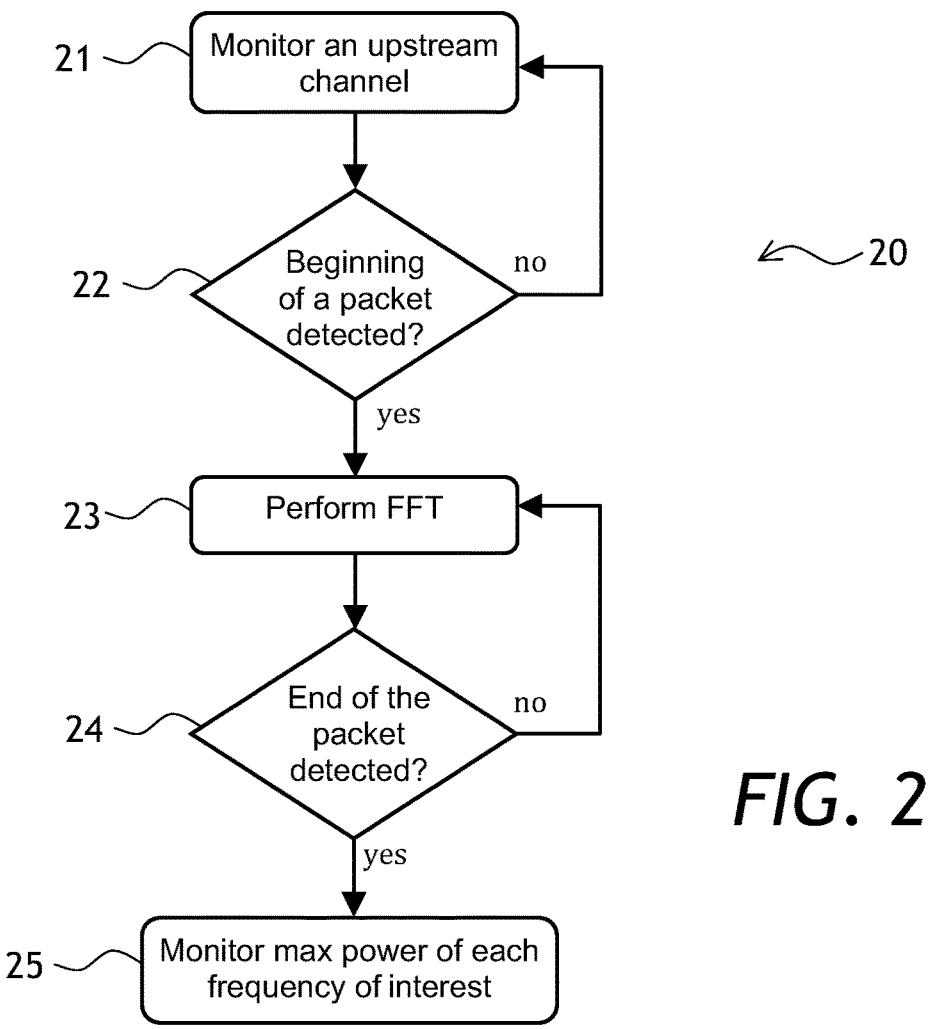
FIG. 2 illustrates a flow chart of a method of the invention for testing the transmission path of the upstream signal using the apparatus of FIG. 1.

Referring to FIG. 2 with further reference to FIG. 1, the operation of the apparatus 10 (FIG. 1) is illustrated by a method 20 (FIG. 2). The apparatus 10 may monitor the first upstream channel in a step 21. When a beginning (the start time) of the first packet is detected in a step 22, the spectrum calculation unit 16 begins to perform a spectrum calculation in a step 23 to obtain the spectrum 17, which can be accumulated in a memory buffer, not shown in FIG. 1. The spectrum calculation step 23 may be performed until an end of the first packet (the end time) is detected in a step 24, at which moment the spectrum calculation stops. In a step 25, a maximum power of each frequency of interest of the obtained spectrum 17 may be monitored. When a threshold of a frequency of interest is exceeded, an alarm may be generated. The spectrum calculation may be performed by any methods known to a skilled person. For example, FFT may be preferred for speed, allowing the packet beginning step 22, the spectrum calculation step 23, and the packet end detection step 24 to be performed in real time. The steps 22 to 24 may also be performed after capturing the digitized upstream signal 13 in a buffer, not shown.

Figure 3:
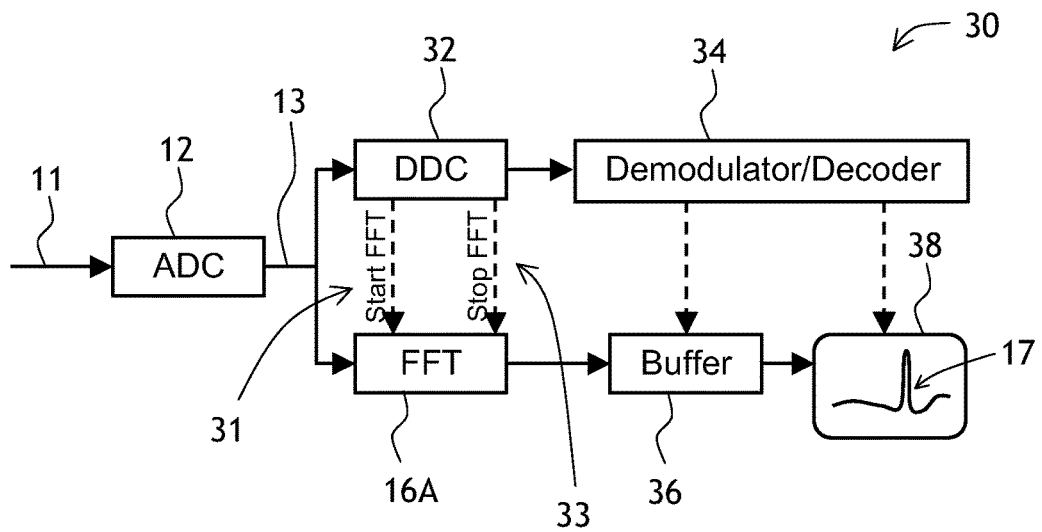
FIG. 3 illustrates a schematic block diagram of one embodiment of the apparatus of FIG. 1 according to the invention.

Turning to FIG. 3 with further reference to FIG. 1, an apparatus 30 of the invention includes the elements of the apparatus 10 of FIG. 1 and further includes an FFT unit 16A as a particular embodiment of the spectrum calculation unit 16. A digital downconverter 32 (DDC; FIG. 3) may be communicatively coupled to the ADC 12, for selecting the first frequency channel from the upstream signal 11 generally carrying multiple frequency channels. The DDC 32 may select the first frequency channel by down-converting the first frequency channel for subsequent demodulation and decoding. In the apparatus 30, the DDC 32 may perform a packet detecting function of the packet detector 14. For example, the DDC 32 may determine the start and end times of the first packet by detecting a power level in the down-converted first channel crossing a pre-defined threshold. In other words, the DDC 32 may down-convert the first frequency channel and monitor the RF power level of the first frequency channel. When the RF power level increases above the threshold, a "Start FFT" command 31 may be sent to the FFT unit 16A to start FFT of the digitized upstream signal 13. When the power level falls below the threshold, a "Stop FFT" command 33 may be sent to the FFT unit 16A to stop the FFT of the digitized upstream signal 13. In one embodiment, the threshold may be defined as a difference between a maximum packet power level acquired during automatic gain control (AGC) and a noise level computed from a minimum operational signal to noise ratio (SNR), which is 10, 16, 19, and 22 dB for QPSK, QAM16, QAM32, and QAM64 packet respectively.

An optional demodulator/decoder 34 may be communicatively coupled to the DDC 32, for demodulating and decoding the first packet. The demodulator/decoder 34 may be configured to detect an error e.g. a symbol error upon demodulation of the first packet, a codeword or another decoding error, and/or a sub-threshold MER condition upon decoding the first packet. The MER threshold may be set by an operator. A memory buffer 36 may be coupled to the FFT unit 16A and configured to retain the spectrum 17 when the demodulator/decoder 34 detects the error, to be able to facilitate determining causes of the error by a threshold analysis. For example, if a signal level at a specific frequency offset from the channel carrier frequency exceeds a threshold that can be set by an operator, an alarm may be generated. In addition, the spectrum 17 obtained during transmission of the erroneous data packet may be visually inspected. A display 38 may be communicatively coupled to the memory buffer 36, for displaying the spectrum 17 when the demodulator/decoder 34 detects the error.

Figure 4:
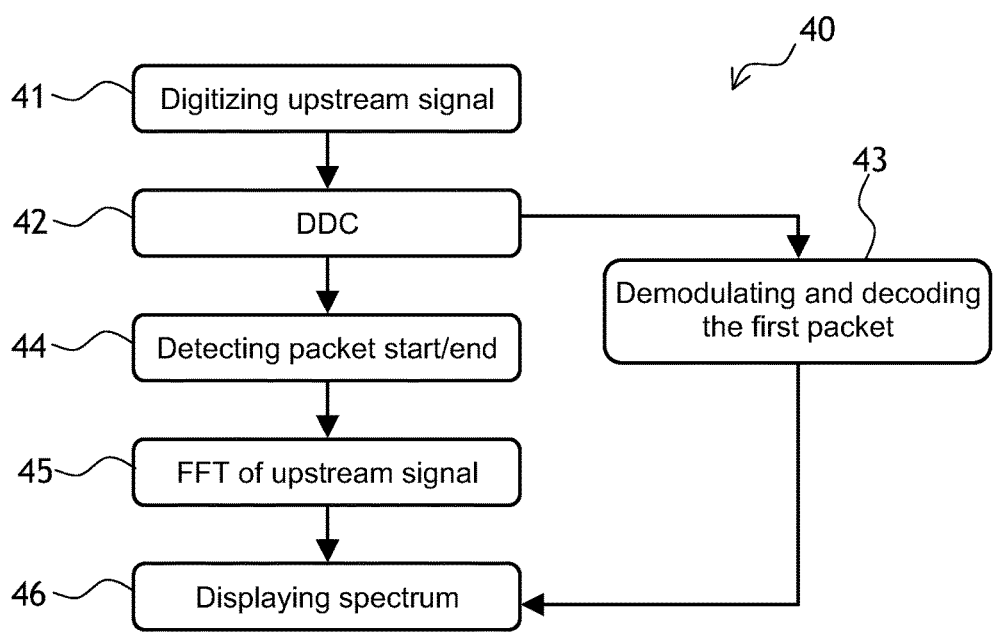
FIG. 4 illustrates a flow chart of a method of the invention for testing the transmission path of the upstream signal using the apparatus of FIGS. 1 and 3.

Referring now to FIG. 4 with further reference to FIG. 3, the operation of the apparatus 30 (FIG. 3) is illustrated by a method 40 (FIG. 4) for testing a transmission path of the upstream signal 11 in a cable network, not shown. In a step 41, the upstream signal 11 may be digitized by the ADC 12 to obtain the digitized upstream signal 13. In an optional step 42, the digitized upstream signal 13 may be downconverted to select the first channel. The downconverted digitized upstream signal 13 may be then optionally demodulated and decoded in a step 43. The start and end times may be determined in a step 44 by detecting an RF power level in the first channel crossing the pre-defined threshold, using a comparator. The FFT of the digitized upstream signal 13 is performed in a step 45. Finally, in an optional step 46, the spectrum 17 may be displayed on the display 38.

In one embodiment, the digitized upstream signal 13 may be retained in a cyclic buffer, not shown. The demodulator/decoder 34 may be configured to determine the start and end times by receiving and analyzing a preamble of the demodulated first packet. The apparatus 30 may be configured to retrieve the digitized upstream signal 13 from the cyclic buffer and perform the spectral analysis once a demodulation error, a codeword error, or another abnormal condition is detected.

The spectrum 17 may be retained in the memory buffer 36 and/or displayed on the display 38 upon detecting the demodulation error by the demodulator/decoder 34. To facilitate correlation of the error with ingress spectrum, two spectra 17 may be collected, one corresponding to a packet having an error, and one corresponding to an errorless packet. The two spectra 17 may be displayed together, to facilitate identification of a feature on the spectrum 17 responsible for the error detected by the demodulator/decoder 34. In other words, after obtaining the first spectrum 17 for an upstream packet having an error, the necessary steps 41, 42, 44, and 45 of the method 40 may be repeated to obtain a second upstream spectrum of a second packet having no errors, and the displaying step 46 may include displaying the first and second spectra together, for visual comparison. It should be appreciated that a computer-aided comparison (e.g. calculating a differential spectrum) may also be generated and used.

The above described visual analysis may be supplemented by an automatic determination of an alarm condition corresponding to a particular spectral feature in the ingress noise, For instance, an alarm may be automatically raised when a power level at a pre-defined frequency of the spectrum 17 obtained in the step 45 of the method 40 exceeds a threshold. The threshold and the frequency may be pre-defined, provided dynamically, or simply entered by the technician during testing.

Figure 5:
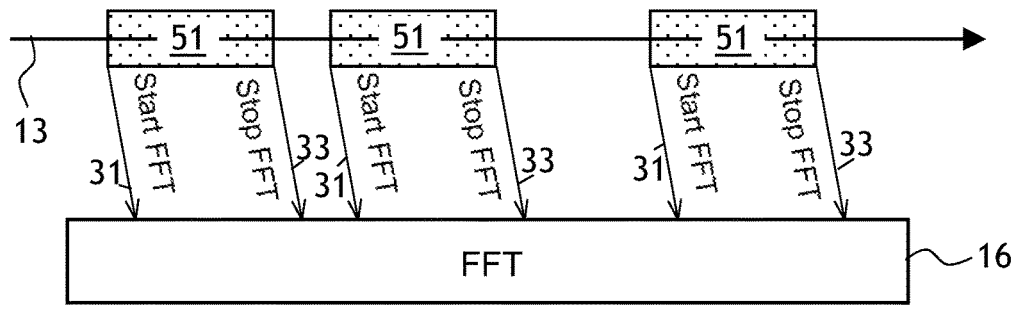
FIG. 5 illustrates a schematic diagram of a method for performing a real-time FFT of upstream packets according to the invention.

Referring to FIG. 5 with further reference to FIGS. 3 and 4, the digitized upstream signal 13 includes a plurality of upstream packets 51. The "Start FFT" and "Stop FFT" commands 31 and 33, respectively, may be generated in the step 44 (FIG. 4) by the DDC 32 (FIG. 3), to begin and to end the FFT process, respectively, performed by the FFT unit 16A. The spectra 17 for each of the upstream packets 51 may be accumulated, preferably separately, in the buffer 36, and/or displayed on the display 38 in the step 46. Since the spectra 17 have been obtained at exact times the upstream packets 51 were transmitted, they may only show spectral features present during transmission of the corresponding upstream packets 51, and may suppress features only present when the corresponding packets 51 are not transmitted. As explained above, the further discrimination of the spectra 17 may be based on the occurrence of demodulation and/or decoding errors or other abnormal conditions, for example symbol errors, codeword errors, low power, variable power level per packet, and/or low MER.

The FFT procedure may operate with a pre-defined number of samples of the digitized upstream signal 13. Since the packet duration tend to have a large arbitrary number of samples, the step 45 (and the step 23 of the method 20 of FIG. 2, for that matter) may include performing a plurality of consecutive FFT cycles, each FFT cycle running for only a portion of a time interval between the start and end times of the upstream packet 51. The portion of the digitized upstream signal 13 between the start and end times of the upstream packet 51 may be split into sub-portions, each sub-portion being processed in one of the plurality of FFT cycles. Each sub-portion of the digitized upstream signal 13 may be FFT processed in the corresponding FFT cycle to yield an intermediate FFT spectrum of the upstream signal 13 during transmission of a corresponding sub-portion of the digitized upstream signal 13. As a result, each intermediate FFT spectrum may be representative of a condition of the transmission path during transmission of the corresponding sub-portion of the digitized upstream signal 13.

In other words, each FFT cycle may compute an intermediate FFT spectrum of only a sub-portion of the digitized upstream signal 13 portion between the start and end times of the upstream packet 51, whereby each intermediate FFT spectrum is representative of a condition of the transmission path during transmission of the corresponding sub-portion of the digitized upstream signal 13 portion between the start and end times of the upstream packet 51. This feature may provide an insight into a time evolution of the spectrum 17 of the digitized upstream signal 13 as the upstream packet 51 is transmitted.

If the time evolution is not of primary interest, the intermediate FFT spectra may be accumulated or averaged to improve signal-to-noise ratio of the resulting spectrum 17. Furthermore, minimum or maximum values may be found for every frequency bin of the upstream spectrum 17. These minimum or maximum values, plotted as a function of frequency, may form "minimum spectra" or "maximum spectra" of the digitized upstream signal 13.

By way of a non-limiting example, the upstream packet 51 may last for 200 microseconds. A 1024-point long fast Fourier transform (1024 p FFT) may take only 5 microseconds. Thus, up to 40 1024 p FFT cycles may be performed to obtain the upstream spectrum 17. These 40 intermediate FFT spectra may be accumulated or averaged to obtain the spectrum 17 of the digitized upstream signal 13.

Figure 6A:
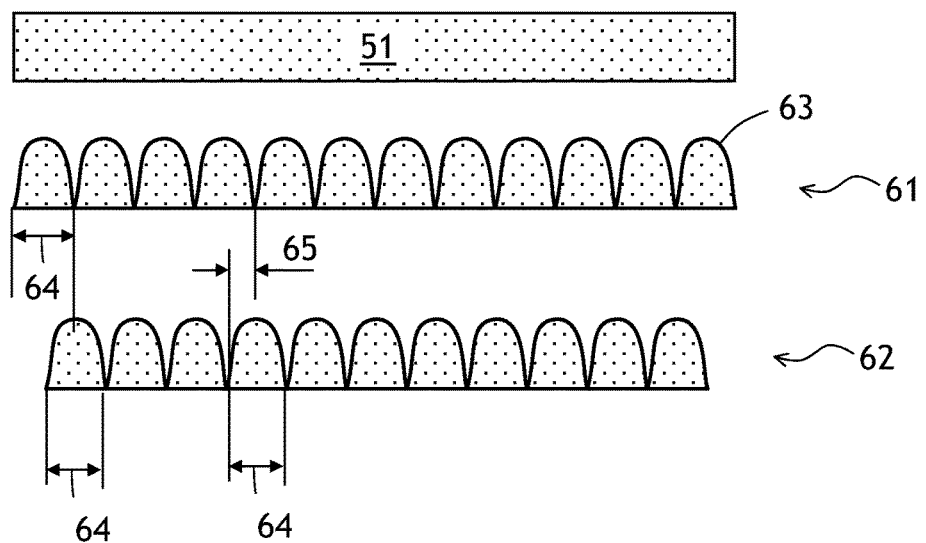
FIG. 6A illustrates a schematic diagram of a method for a real-time FFT of an upstream packet using two FFT units each performing a train of FFT cycles.
Figure 6B:
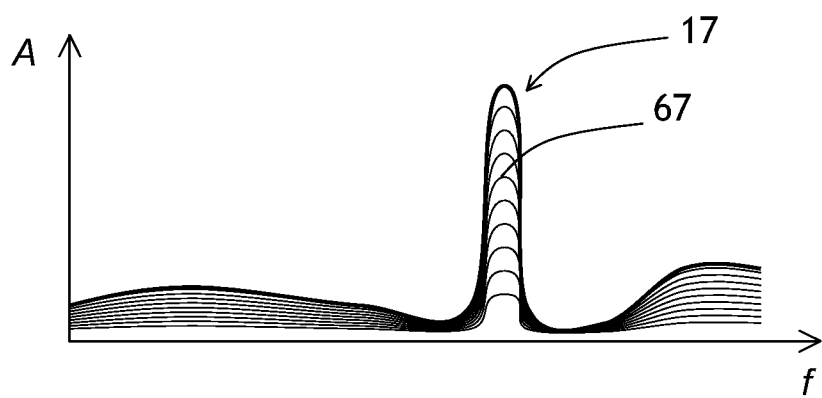
FIG. 6B illustrates an overlapped frequency spectra obtained in the FFT cycles of FIG. 6A.

In another embodiment illustrated in FIG. 6A, the plurality of FFT cycles may comprise not one but two chains of FFT cycles, specifically first 61 and second 62 chains of FFT cycles. The first 61 and second 62 chains of FFT cycles may be shifted with respect to each other by substantially one half 65 of a duration 64 of a single FFT cycle of the plurality of FFT cycles. The sub-portions of the digitized upstream signal 13 portion, corresponding to the first 61 and/or second 62 chains of FFT cycles, may be amplitude apodized, or "windowed", with a suitable apodization or "windowing" function 63. The apodization may lessen spectral perturbations due to "leaking" of ghost frequencies caused by the splitting of the portion of the digitized upstream signal 13 into sub-portions. As shown in FIG. 6B, the first 61 and second 62 chains of FFT cycles yield a plurality of intermediate spectra 67, which are accumulated or averaged to form the upstream spectrum 17.

Figure 7:
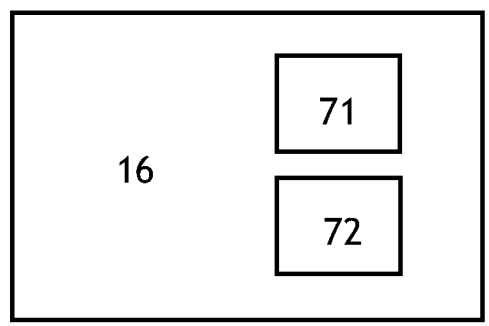
FIG. 7 illustrates a schematic diagram of a FFT unit with two processing blocks, usable in the apparatuses of FIGS. 1 and 3.

Referring to FIG. 7 with further reference to FIGS. 3, 6A, and 6B, the FFT unit 16A may be configured for performing the plurality of FFT cycles 61, 62 (FIG. 6A), each FFT cycle yielding the intermediate FFT spectrum 67 of the digitized upstream signal 13 during a corresponding portion of the time interval. In FIG. 7, the FFT unit 16A may include first and second FFT processing blocks 71 and 72 for simultaneous processing of the first 61 and second 62 chains of FFT cycles. The buffer 36 of the apparatus 30 of FIG. 3 may be configured for accumulating or averaging the intermediate FFT spectra 67 to obtain the spectrum 17 of the digitized upstream signal 13. The FFT processing blocks 71 and 72 (FIG. 7) may be implemented in a field-programmable gate array (FPGA), although other implementations, including software, hardware, and a combination thereof, are possible. It is preferable that the implementation of the apparatuses 10 and 30 of FIGS. 1 and 3, respectively, is compact enough to allow use the apparatuses 10 and 30 in portable cable network tester devices for testing locations of the cable network disposed remotely from a headend of the network. Advantageously, this may allow technicians to obtain the upstream signal spectra 17 locally. Furthermore, the spectra 17 may show ingress noise that is not only local but includes the noise exactly during upstream bursts by the cable modems under test.

By way of an illustration, for a 200 microsecond long upstream data packet one may calculate seventy nine 1024 p FFT operations corresponding to forty first FFT cycles 61, and thirty nine second FFT cycles 62. The cycles 61 and 62 may output the intermediate spectra 67, in which each frequency, or "frequency bin", is assigned a value corresponding to the signal amplitude at that frequency. The peak magnitude of each frequency bin may be captured for all seventy nine 1024 p FFT operations. Together, the peak magnitudes may define the frequency spectrum 17 of ingress noise during the packet transmission, which allows the technician to determine a dominant frequency of the impairment.

Figure 8A:
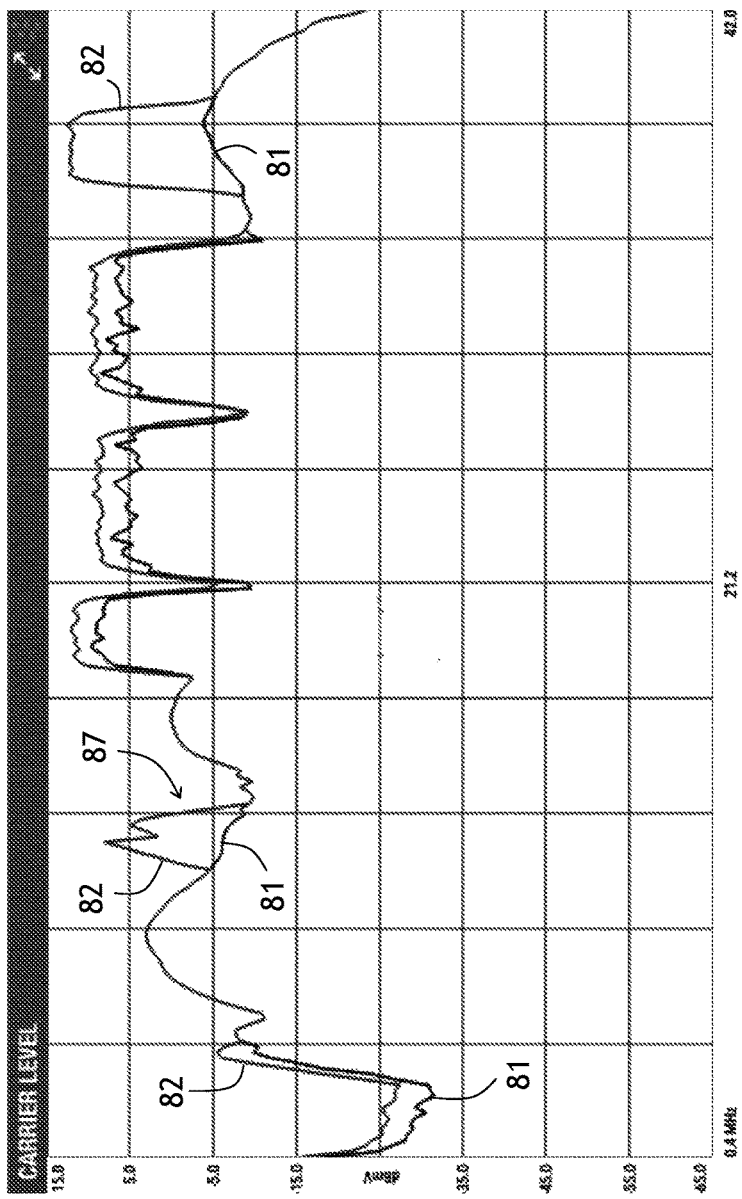
FIG. 8A illustrates a superimposed measured upstream frequency plot using the apparatus of FIG. 3.
Figure 8B:
FIG. 8B illustrates a time trace of modulation error ratios and carrier levels for 600 received packets.

Turning now to FIGS. 8A and 8B, superimposed first and second frequency plots 81 and 82 (FIG. 8A) may correspond to two upstream data packets received in the 19.40 MHz frequency band. In FIG. 8A, the vertical scale denotes the signal level in dBmV, and the horizontal scale denotes frequency in MHz. The received packets are shown to be QAM16 modulated. FIG. 8B shows time traces of three parameters: modulation error ratio (MER) 83, un-equalized MER 84, and carrier level 85. The carrier level 85 is shown in an almost straight solid line. The left vertical scale denotes MER in dB units, the right vertical scale denotes carrier level in dBmV, and the horizontal scale denotes the serial number of a received packet. Peaks 86 denote drops in the non-equalized MER 84 resulting in a codeword error of a received packet. The first frequency plot 81 (FIG. 8A) corresponds to a packet with no codeword error; and the second frequency plot 82 corresponds to a packet with a codeword error. It should be appreciated that receiving a packet with the codeword error may correlate with a spectral feature 87, which is likely responsible for the error.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An apparatus for testing a transmission path in a cable network, the apparatus comprising:
   an analog-to-digital converter (ADC) to digitize an upstream signal of the transmission path into a digitized upstream signal;
   a packet detection circuit communicatively coupled to the ADC, the packet detection circuit to determine start and end times of a first packet received by the apparatus in a first frequency channel of the digitized upstream signal; and
   a spectrum calculation circuit communicatively coupled to the ADC and the packet detection circuit, the spectrum calculation circuit to perform a plurality fast Fourier transform (FFT) cycles, each FFT cycle to compute a FFT spectrum of a portion of the digitized upstream signal corresponding to the determined start and end times of the first packet.

2. The apparatus of claim 1, wherein the packet detection circuit comprises a digital downconverter (DDC) to downconvert and select the first frequency channel from a plurality of frequency channels in the digitized upstream signal.

3. The apparatus of claim 2, wherein to determine the start and end times of the first packet, the packet detection circuit detects an RF power level in the first frequency channel crossing a pre-defined threshold.

4. The apparatus of claim 2, further comprising a demodulator communicatively coupled to the digital downconverter, the demodulator to demodulate the first packet and to determine the start and end times by receiving and analyzing a preamble of the first packet.

5. The apparatus of claim 4, further comprising:
   a decoder communicatively coupled to the demodulator,
   a buffer coupled to the spectrum calculation circuit; and
   a display coupled to the buffer;
   wherein the decoder is to detect a decoding error and the demodulator is to detect a demodulating error,
   wherein the buffer to retain the FFT spectrum if at least one of the demodulating error and the decoding error is detected; and
   wherein the display is to display the FFT spectrum in response to the detection of the at least one error.

6. The apparatus of claim 1, wherein the FFT spectrum is computed from a sub-portion of the digitized upstream signal portion between the start and end times of the first packet, and wherein the FFT spectrum of each FFT cycle is representative of a condition of the transmission path during transmission of the corresponding sub-portion of the digitized upstream signal portion between the start and end times of the first packet.

7. The apparatus of claim 1, wherein the plurality of FFT cycles comprises a first chain and a second chain of FFT cycles, wherein the first and the second chains of FFT cycles are shifted simultaneously with respect to each other.

8. The apparatus of claim 5, wherein the buffer is to accumulate the FFT spectra to obtain at least one of an averaged, a minimum, and a maximum spectrum of the digitized upstream signal.

9. The apparatus of claim 1, further comprising a memory buffer to buffer the digitized upstream signal between the start and end times of the first packet, wherein the spectrum calculation circuit performs the plurality fast Fourier transform (FFT) cycles on the buffered digitized upstream signal.

10. A portable cable network tester device, the tester device comprising:
    an analog-to-digital converter (ADC) to digitize a signal into a digitized signal;
    a packet detection circuit communicatively coupled to the ADC, the packet detection circuit to determine start and end times of a first packet received by the tester device in a first channel of the digitized signal;
    a spectrum calculation circuit communicatively coupled to the ADC and the packet detection circuit, the spectrum calculation circuit to perform a plurality fast Fourier transform (FFT) cycles, each FFT cycle to compute a FFT spectrum of a portion of the digitized signal corresponding to the determined start and end times of the first packet;
    a demodulator-decoder coupled to the packet detection circuit to demodulate and decode the first packet, wherein the demodulator-decoder is to detect at least one of a demodulation error and a decoding error; and
    a display to display an FFT spectrum of at least a portion of the digitized signal in response to the detection of the at least one error.

11. The portable cable network tester device of claim 10, further comprising a memory buffer to buffer the digitized signal between the start and end times of the first packet, wherein the spectrum calculation circuit performs the plurality fast Fourier transform (FFT) cycles on the buffered digitized upstream signal.

12. A method for testing a transmission path of an upstream signal in a cable network, the method comprising:
    digitizing, using an analog-to-digital converter (ADC) an upstream signal to obtain a digitized upstream signal having a first frequency channel;
    determining, using a packet detection circuit, start and end times of a first packet of the first frequency channel; and
    computing, using a spectrum calculation circuit, a FFT spectrum of a portion of the digitized upstream signal corresponding to the determined start and end times of the first packet, wherein computing the FFT spectrum comprises performing a plurality of fast Fourier transform (FFT) cycles, each FFT cycle of the plurality of FFT cycles computing an intermediate FFT spectra of a sub-portion of the digitized upstream signal.

13. The method of claim 12, further comprising raising an alarm if a power level at a pre-defined frequency of the FFT spectrum exceeds a threshold.

14. The method of claim 12, wherein the digital signal comprises a plurality of frequency channels and determining the start and end times of the first packet comprises down-converting the digitized upstream signal to select the first frequency channel, and detecting an RF power level in the first channel crossing a threshold.

15. The method of claim 12, wherein determining the start and end times comprise:
    demodulating and decoding the first packet; and
    analyzing a preamble of the first packet.

16. The method of claim 15, further comprises detecting an error in the at least one of the demodulating and the decoding of the first packet and retaining the FFT spectrum of the portion of the digitized upstream signal corresponding to the determined start and end times of the first packet.

17. The method of claim 16, further comprising:
    computing a second FFT spectrum of a second packet having no errors; and
    displaying together the first and second FFT spectra.

18. The method of claim 12, further comprising accumulating the intermediate FFT spectra to obtain at least one of an averaged, a minimum, and a maximum spectrum of the digitized upstream signal.

19. The method of claim 12, wherein the plurality of FFT cycles comprises a first chain of FFT cycles shifted with respect to a second chain of FFT cycles.

20. The method of claim 12, wherein the sub-portions of the digitized upstream signal portion corresponding to plurality of FFT cycles are amplitude apodized.

* * * * *